United States Patent
Jonas

[11] Patent Number: 6,090,729
[45] Date of Patent: Jul. 18, 2000

[54] SHEET MATERIAL FOR CORE SUPPORT

[75] Inventor: Thomas F. Jonas, Southbury, Conn.

[73] Assignee: FiberCote Industries, Inc., Waterbury, Conn.

[21] Appl. No.: 09/287,876

[22] Filed: Apr. 7, 1999

Related U.S. Application Data

[63] Continuation of application No. PCT/US97/18067, Oct. 7, 1997
[60] Provisional application No. 60/028,034, Oct. 8, 1996.

[51] Int. Cl.⁷ .................................................. B32B 17/02
[52] U.S. Cl. ............................ 442/180; 442/59; 442/175
[58] Field of Search ............................... 442/59, 175, 180

[56] References Cited

U.S. PATENT DOCUMENTS

| | | |
|---|---|---|
| 3,084,426 | 4/1963 | Hugo et al. . |
| 3,586,559 | 6/1971 | Shepard . |
| 3,767,441 | 10/1973 | Shepard . |
| 3,776,729 | 12/1973 | Levy et al. ........................ 430/280.1 |
| 3,873,637 | 3/1975 | Fujiwara et al. . |
| 3,888,942 | 6/1975 | Tsen . |
| 4,311,661 | 1/1982 | Palmer . |
| 4,322,456 | 3/1982 | Martin . |
| 4,445,956 | 5/1984 | Freeman et al. . |
| 4,612,156 | 9/1986 | Heinemeyer et al. . |
| 5,470,622 | 11/1995 | Rinde et al. ........................ 428/34.9 |
| 5,565,011 | 10/1996 | Follett et al. ........................ 51/297 |
| 5,714,252 | 2/1998 | Hogerton et al. . |
| 5,756,554 | 5/1998 | Fisher ................................. 521/48.5 |
| 5,908,889 | 6/1999 | Bailey et al. . |

FOREIGN PATENT DOCUMENTS

| | | |
|---|---|---|
| 0 392 348 | 10/1990 | European Pat. Off. . |
| 0 465 719 A2 | 1/1992 | European Pat. Off. . |
| 91/03835 | 3/1991 | WIPO . |
| WO 91/03835 | 3/1991 | WIPO . |

*Primary Examiner*—Terrel Morris
*Assistant Examiner*—Ula C. Ruddock
*Attorney, Agent, or Firm*—Rader, Fishman, Grauer & Mc Garry, An Office of Rader, Fishman & Grauer PLLC

[57] ABSTRACT

A non-porous sheet for bonding to honeycomb-type core structures to be machined on a vacuum chuck includes a woven fiberglass fabric impregnated with a nonporous epoxy-thermoplastic resin having a low melting temperature. The epoxy-thermoplastic resin comprises a blend of bisphenol-A based epoxy and phenoxy thermoplastic. The nonporous sheet is exposed to a relatively low temperature for about five minutes to soften the epoxy-thermoplastic resin. A core structure is placed on the softened sheet and the sheet is allowed to cool to ambient temperature to adhere the non-porous sheet to the core. The core and sheet assembly can then be placed on the surface of a vacuum chuck associated with a machine tool for a subsequent machining operation of the core structure. When the machining operation is finished, the nonporous sheet is easily removed from the core structure by heating the core and sheet assembly slightly above ambient temperature and then peeling off the sheet from the core for reuse. In this manner, the core is not damaged and little or no residue is left on the core from the sheet.

12 Claims, 2 Drawing Sheets

SHEET MATERIAL FOR CORE SUPPORT

CROSS REFERENCE TO RELATED APPLICATIONS

This application is a continuation of PCT International Application Number PCT/US97/18067 filed Oct. 7, 1997, which claims the benefit of U.S. Provisional Application Ser. No. 60/028,034, filed Oct. 8, 1996.

FIELD OF THE INVENTION

This invention relates to reinforced sheet materials, and more particularly to a reinforced sheet material that is readily attachable to honeycomb-type core structures or other similar core structures for holding the cores during machining operations. In one of its aspects, the invention relates to a method of machining a honeycomb-type or similar core structure.

DESCRIPTION OF RELATED ART

Lightweight core structures sandwiched between two skins are commonly used in aircraft construction and other environments where high strength to weight ratios are required. Honeycomb-type core structures are especially suitable for these types of environments. The core structure is typically produced in block form and then machined to the required shape. A skin layer is then bonded to each side of the core structure to produce the final product. Since the walls of the core structure are relatively thin, the material cannot be adequately mechanically clamped during the machining operation without distorting or damaging the walls. In an effort to overcome this problem, the core structure is presently clamped to a vacuum chuck of a machine tool. Since the core structure is highly porous and cannot be clamped with a vacuum chuck by itself, a layer of nonporous thermosetting material is typically adhered to one face of the core to form a barrier for the application of a vacuum force from the vacuum chuck. The nonporous layer currently in use comprises a thermosetting resin that is cured on one face of the core structure at a temperature of about 250° F. for approximately 30 minutes to one hour. Although this layer forms an adequate impermeable barrier for the vacuum chucking during machining, the curing process is time consuming and removal of the layer after machining is quite difficult. A large amount of force is required to remove the thermosetting layer from the core structure. This removal process may result in damage of the core face and/or leave an undesirable residue of thermosetting resin on the core structure. Any residue left on the core structure may adversely affect adhesion of the skin layers thereto. In addition, the thermosetting resin must be kept in cold storage when not in use, since it is unstable at room temperature.

SUMMARY OF THE INVENTION

According to the invention, a sheet of nonporous, reusable sheet material for relatively quick bonding to a core structure to be machined includes a porous fabric impregnated with an impervious resin blend in sufficient quantity to render the fabric nonporous. The resin blend comprises an epoxy resin and a thermoplastic resin with the epoxy resin being present in the blend in the range of about 35 to about 65 percent by weight and the thermoplastic resin being present in the blend in the range of about 65 to about 35 percent by weight. The resins are selected so that the resin blend softens at a temperature in the range of about 100° F. to about 300° F. Preferably, the epoxy resin in the blend is about 45 percent by weight and the thermoplastic resin is present in the blend in about 55 percent by weight and the resin blend softens at a temperature in the range of about 200° F. to about 250° F. The epoxy resin is preferably a bisphenol-A based epoxy and the thermoplastic resin is preferably a phenoxy thermoplastic. Alternatively, the thermoplastic resin can be selected from the group of polyvinyl formal resins, polyvinyl butyral resins, and polyetherimide resins.

The nonporous fabric preferably comprises a first set of strands oriented in a warp direction interwoven with a second set of strands oriented in a weft direction. Preferably, the first and second sets of strands are fiberglass.

Further according to the invention, a method of machining a core structure comprises the steps of heating a nonporous sheet material to a temperature within the temperature range of about 200° F. to about 250° for a predetermined time interval to soften the resin; placing the sheet material and core structure in contact with each other to laminate the core to the non-porous sheet; and cooling the resin to room temperature to thereby adhere the sheet material to the structure. Preferably, the predetermined time interval is about five minutes. The sheet material and adhered core structure are then placed on a vacuum chuck and a vacuum pressure is applied to the sheet material to hold the sheet material and core structure on the vacuum chuck. One or more machining operations are performed on the core structure and the core structure is then removed from the sheet material, preferably by heating the sheet material to a removal temperature substantially below the application temperature range to thereby completely remove the resin from the core structure. With this arrangement, the sheet material can be bonded to other core structures to be machined, since the resin does not transfer to the core structure when the sheet material is removed.

Preferably, the non-porous sheet comprises a porous fabric impregnated with a resin of sufficient quantity to render the fabric non-porous. The resin comprises a blend of epoxy and thermoplastic resins which soften and become adherent within the temperature range of about 200° F. to about 250°. The resin is selected to be non-adherent at a lower temperature and adherent in the elevated temperature range.

Preferably, the epoxy resin in the resin blend is present in the blend in the range of about 35 to about 65 percent by weight and the thermoplastic resin is present in the blend in the range of about 65 to about 35 percent by weight. The resins are selected so that the resin blend softens at a temperature in the range of about 100° F. to about 300° F. Preferably, the epoxy resin in the blend is about 45 percent by weight and the thermoplastic resin is present in the blend in about 55 percent by weight and the resin blend softens at a temperature in the range of about 200° F. to about 250° F. The epoxy resin is preferably a bisphenol-A based epoxy and the thermoplastic resin is preferably a phenoxy thermoplastic. Alternatively, the thermoplastic resin can be selected from the group of polyvinyl formal resins, polyvinyl butyral resins, and polyetherimide resins.

These and other objects, features and advantages will be apparent from the ensuing description taken in conjunction with the accompanying drawings.

BRIEF DESCRIPTION OF THE DRAWINGS

The invention will now be described with reference to the drawings in which.

DETAILED DESCRIPTION OF THE PREFERRED EMBODIMENTS

Figure 1:
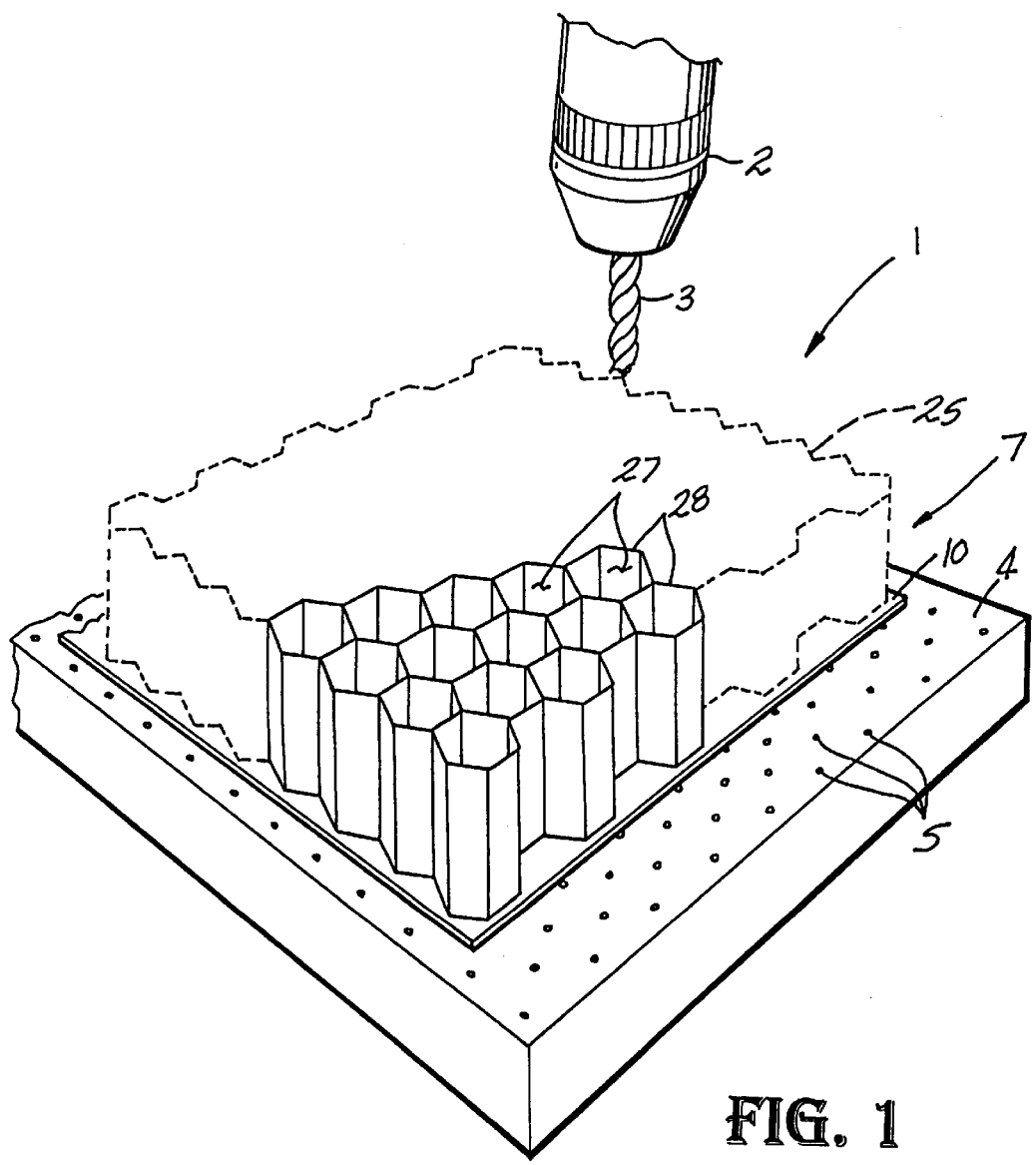
FIG. 1 is a perspective view of the core structure and sheet material clamped to a vacuum table of a machine tool.

With reference now to FIG. 1, a machine tool 1, such as a milling machine, drill press, etc., includes a chuck 2 that receives a cutting bit 3 and a table 4. The table 4 comprises apertures 5 that are connected to a vacuum source (not shown) in a well known manner to form a vacuum chuck for a workpiece assembly 7. The workpiece assembly 7 includes a nonporous base material 10 bonded to a porous core structure 25. The core 25 is typically constructed of a light-weight material, such as aluminum. However, the invention can be practiced with core structures constructed of almost any material. The nonporous layer 10 serves to hold the core 25 on the vacuum table 4 without damaging the core. The core structure 25, as illustrated, has a plurality of honeycomb cells 27 formed by walls 28. The walls 28 are machined to form a predetermined core shape. After completion of the machining operation, the base material 10 is then removed and discarded (or may be reused) and the core is subsequently bonded between two skin layers (not shown) through well known techniques.

Figure 2:
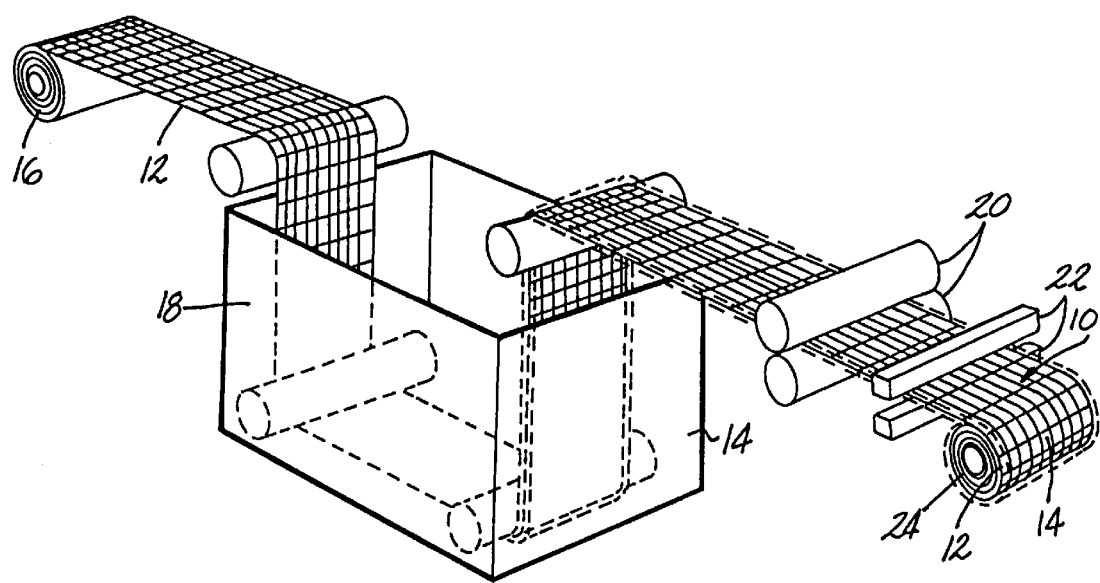
FIG. 2 is a schematic perspective view of a process for forming the sheet material according to the invention.

As shown in FIG. 2, a nonporous sheet material 10 that is suitable for the above-described arrangement and in accordance with the present invention comprises a layer 12 of woven fiberglass fabric impregnated with an epoxy-thermoplastic resin solution 14. The epoxy-thermoplastic resin has a low melting point and preferably softens in a temperature range of about 200° F. to 250° F.

A suitable epoxy-thermoplastic resin comprises a blend of bisphenol-A based epoxy and phenoxy thermoplastic resins. Preferably, the epoxy resin is diglycidyl ether of bisphenol-A while the thermoplastic resin is phenol,4,4'-(1-methylethylidene) bispolymer with (chloromethyl) oxirane. An example of the diglycidyl ether of bisphenol-A is Epon® 828, Shell Chemical Co. An example of the thermoplastic resin phenol,4,4'-(1-methylethylidene) bispolymer with (chloromethyl) oxirane is Paphen® PKHS, Phenoxy Associates. The percent by weight of epoxy in the solution is in the range of 35% to 65% and is preferably about 45%, while the percent by weight of thermoplastic in the solution is in the range of 65% to 35% and is preferably bout 55%. Although a particular epoxy and thermoplastic resin has been described, it is to be understood that other types of epoxy resins and thermoplastic resins can be used in varying quantities that together soften in a temperature range of about 200° F. to 250° F. Suitable thermoplastics include polyvinyl formal resins, polyvinyl butyral resins, polyetherimide resins, etc.

The fiberglass fabric is preferably constructed of a first set of fiberglass strands oriented in a warp direction and interwoven with a second set of fiberglass strands oriented in a weft direction. The strands are preferably interwoven in a crow-foot or four-harness weave, wherein one set of strands extends over four strands and under one strand of the other set. Alternatively, the strands can be interwoven with a plain weave, basket weave, etc. The preferred fabric contains approximately sixty strands per inch in the warp direction and 58 strands per inch in the weft direction, and weighs approximately three ounces per square yard. Although a particular fabric arrangement has been described by way of example, it is to be understood, that the type of material that forms the strands, the number of strands per inch, and the weight of the fabric can be modified depending on the particular strength, flexibility, porosity, etc., required in a given application, and the particular epoxy-thermoplastic resin used. A fabric with a weight as low as 1.5 ounces per square yard was found to be satisfactory. The fabric 12 thus formed is wound in a bolt 16 and stored.

The nonporous sheet material 10 can be formed by either of the well known methods of solution impregnation or hot melt impregnation. In the solution impregnation method, as illustrated in FIG. 2, the phenoxy and epoxy resins are dissolved in an organic solvent such as methyl ethyl ketone or acetone in a tank 18. The fabric 12 is then unrolled from the bolt 16 and passed through the dissolved resin solution 14 within the tank 18. The fabric 12 and impregnated solution 14 are then passed through one or more sets of metering rolls 20 to regulate the amount of solution that is to remain with the fabric 12. The fabric 12 with the remaining solution 14 is then passed through an oven, as represent by numerals 22, to evaporate the solvent and set the resin to the fabric. The nonporous material 10 thus formed is rolled into a bolt 24 and stored. The material 10 is very stable at room temperature, and therefore does not require a release sheet or cold storage as the prior art material.

In the hot melt impregnation method (not shown), the two resins are melted together to form a solution and are cast as a film on a release sheet. The fabric 12 is then sandwiched between a release sheet and the resin film and passed through a pair of heated metering rollers. The heat and pressure from the metering rollers forces the resin solution into the fabric and the spacing between the rollers controls the sheet thickness. After cooling, the release sheets can be removed and the fabric can be rolled into a bolt and stored.

Figure 3:
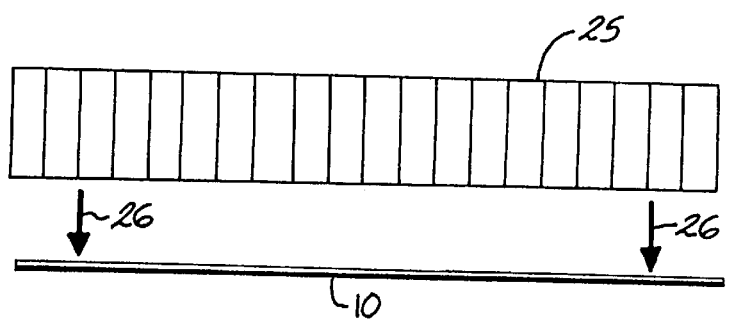
FIG. 3 is a side elevational view of a core structure being attached to the sheet material.

With reference now to FIG. 3, the nonporous sheet 10 is cut from the bolt 24 and is exposed to a temperature in the range of 200° F. to 250° F. for about five minutes to soften the epoxy-thermoplastic resin. When the preferred resins as described above are used to form the sheet 10, a temperature in the range of 210° F. to 220° F. is sufficient to soften the epoxy-thermoplastic resin. A core 25 is placed on the softened sheet 10 in a direction as denoted by arrows 26 and the sheet is allowed to cool. The core and sheet assembly 7 can then be placed on the surface of a vacuum chuck 4 associated with a machine tool 1 for a machining operation. When the machining operation is finished, the sheet 10 is easily removed from the core 25 by heating the assembly 7 slightly above ambient temperature to a removal temperature of approximately 100° F. and then peeling off the sheet from the core. In this manner, the core 25 is not deformed and virtually no residue is left on the core from the sheet 10. Alternatively, the sheet 10 can be removed from the core 25 at ambient temperature through the application of a slightly greater force than required at the elevated removal temperature without leaving residue.

If any residue should somehow be left on the core after the sheet 10 is removed, which may occur when the epoxy-thermoplastic resin composite is inadvertently heated well above ambient to its liquid state, the epoxy-thermoplastic resin can be left on the core. The epoxy-thermoplastic resin is preferably compatible with any adhesives used to bond the skin layers to the core, such as the thermoplastic resins described above and will not interfere with the bonding of the skin layer to the core.

Surprisingly, the thermoplastic resin according to the present invention controls the flow at elevated temperatures and adhesion of the epoxy-thermoplastic resin composite when the core is bonded to the sheet 10 and when the sheet is removed from the core. Without the thermoplastic resin, the epoxy resin may flow into the core and could prohibit the formation of a suitable bond between the core and sheet. Likewise, the use of a thermoplastic resin without the epoxy resin may result in an insufficient flow of the thermoplastic resin to the core and may result in insufficient bonding of the non-porous sheet to the core.

The sheet 10 formed according to the invention significantly reduces the amount of time required to bond the core and sheet together and thus reduces manufacturing costs, when compared with the prior art. The lower bonding temperature assures that the strength of the fiberglass strands will not be compromised. After the sheet 10 is removed from the machined core 25, the sheet can be cleaned and reused to bond additional cores, since none of the thermoplastic material is left on the core 25.

Although the sheet 10 has been described for use with a core structure in a vacuum chucking operation, it is to be understood that the sheet 10 can be bonded to other structures where a temporary but strong attachment is desired. For example, both sides of the sheet 10 can be activated through an iron or heat gun to temporarily bond a workpiece or other object to a bench top or other surface without the use of a vacuum chuck.

Reasonable variation and modification are possible within the spirit of the foregoing specification and drawings without departing from the scope of the invention which is defined in the appended claims.

The embodiments of the invention in which an exclusive property or privilege is claimed are defined as follows:

1. A nonporous sheet material for temporary or permanent bonding to a work piece, the sheet material comprising:

a porous fabric impregnated with a resin blend in sufficient quantity to render the fabric nonporous, the resin blend comprising a blend of epoxy and thermoplastic resins; the epoxy resin being present in the blend in the range of about 35 to about 65 percent by weight and the thermoplastic resin being present in the blend in the range of about 65 to about 35 percent by weight, and the thermoplastic and epoxy resins are selected such that the resin blend softens at a temperature in the range of about 100° F. to about 300° F.;

wherein the nonporous, reusable sheet material can be bonded to the structure by heating the sheet material to a temperature within the temperature range to soften the resin, placing the sheet material and structure in mutual contact, and then cooling the sheet material to ambient temperature.

2. A nonporous, reusable sheet material according to claim 1 wherein the epoxy in the blend is about 45 percent by weight and the thermoplastic in the blend is about 55 percent by weight and the resin blend softens at a temperature in the range of about 200° F. to about 250° F.

3. A nonporous, reusable sheet material according to claim 2 wherein the epoxy resin is a bisphenol-A based epoxy resin.

4. A nonporous, reusable sheet material according to claim 3 wherein the thermoplastic resin is a phenoxy thermoplastic resin.

5. A nonporous, reusable sheet material according to claim 4 wherein the epoxy resin is diglycidyl ether of bisphenol-A and the thermoplastic resin is phenol,4,4'-(1-methylethylidene) dispolymer with (chloromethyl) oxirane.

6. A nonporous, reusable sheet material according to claim 1 wherein the porous fabric is woven.

7. A nonporous, reusable sheet material according to claim 6 wherein the fabric is fiberglass.

8. A nonporous, reusable sheet material according to claim 1 wherein the epoxy resin is a bisphenol-A based epoxy resin.

9. A nonporous, reusable sheet material according to claim 8 wherein the thermoplastic resin is a phenoxy thermoplastic resin.

10. A nonporous, reusable sheet material according to claim 9 wherein the epoxy resin is diglycidyl ether of bisphenol-A and the thermoplastic resin is phenol,4,4'-(1-methylethylidene) bispolymer with (chloromethyl) oxirane.

11. A nonporous, reusable sheet material according to claim 1 wherein the thermoplastic is selected from the group consisting of polyvinyl formal resins, polyvinyl butyral resins, and polyetherimide resins.

12. A laminate comprising a porous core and a non-porous sheet material according to claim 1 wherein the porous core is bonded to the sheet material by heating the sheet material to a temperature at which the resin in the sheet material softens and then cooling the laminate to adhere the core to the sheet material, and wherein the core is removable from the sheet material by heating the laminate to a temperature at which the sheet material softens and removing the core from the laminate.

* * * * *